BIT SYNCHRONIZATION OF DPSK DATA TRANSMISSION SYSTEM

Filed Aug. 18, 1965 4 Sheets-Sheet 1

INVENTORS
HAROLD C. KLUEVER
KENNETH R. MacDAVID

BY Spencer E. Olson
ATTORNEY

Sept. 10, 1968 H. C. KLUEVER ET AL 3,401,339

BIT SYNCHRONIZATION OF DPSK DATA TRANSMISSION SYSTEM

Filed Aug. 18, 1965 4 Sheets-Sheet 2

INVENTORS
HAROLD C. KLUEVER
KENNETH R. MacDAVID
BY Spencer E. Olson
ATTORNEY

BIT SYNCHRONIZATION OF DPSK DATA TRANSMISSION SYSTEM

Filed Aug. 18, 1965 4 Sheets-Sheet 3

INVENTORS
HAROLD C. KLUEVER
KENNETH R. MacDAVID
BY Spencer E. Olson
ATTORNEY

INVENTORS
HAROLD C. KLUEVER
KENNETH R. MacDAVID
BY Spencer E. Olson
ATTORNEY

United States Patent Office 3,401,339
Patented Sept. 10, 1968

3,401,339
BIT SYNCHRONIZATION OF DPSK DATA TRANSMISSION SYSTEM

Harold C. Kluever, Williamsville, and Kenneth R. MacDavid, Clarence Center, N.Y., assignors to Sylvania Electric Products Inc., a corporation of Delaware
Filed Aug. 18, 1965, Ser. No. 480,603
8 Claims. (Cl. 325—30)

ABSTRACT OF THE DISCLOSURE

A DPSK communication system in which the demodulation timing rates are bit synchronized by transmitting for a given period of time an all "mark" phase reversing message offset by one-half an information bit from normal mode timing. The DPSK demodulator comprises an integrate and dump filter, a digital detector, and a timing source of sample and dump pulses which includes a variable digital divider controlled by feedback signals from the digital detector and a mode selection signal. In the synchronizing mode, the phase of the integrate and dump filter is sampled twice each integration interval, and the time rates from the divider are advanced or retarded in response to the presence or absence of a phase change in that interval.

This invention relates generally to digital communication systems, and more particularly to improved means for establishing and maintaining bit synchronization between a differentially phase shift keyed transmitter and receiver. More broadly, the invention relates to improved means for bit synchronizing a local timing source with received binary coded information.

A digital communication system using optimum detection techniques, such as integrate and dump filters, requires that bit synchronization be established between the transmitter and receiver. This synchronization must be established and maintained to within some fraction of an information interval. To illustrate, consider a typical differentially phase shift keyed (DPSK) communication system, shown in the block diagram of FIG. 1, generally comprising a transmitter or exciter 10 for generating a bi-phase modulated carrier signal and a receiver 12 for detecting the transmitted information. Transmitter 10 includes a carrier oscillator 14, the output of which is modulated in a discrete biphase modulator 16 by an information generator 18 controlled by timing source 20. Receiver 12 includes a radio frequency (RF) amplifier 22, a mixer 24 for mixing the input from the RF amplifier with a signal from a local oscillator 26 to provide an intermediate frequency (IF) output signal, an intermediate frequency amplifier 28, a DPSK signal demodulator 30, and a utilization device 32, which, for example, may comprise data processing equipment such as a computer or teletypewriter system decoder and printer.

The DPSK demodulator 30 typically includes an integrate and dump (I & D) filter 34, or other suitable high Q resonant circuit, to which the IF signal output of amplifier 28 is applied, a digital detector 36 for sampling the output of the I & D filter and providing phase storage and comparison functions and an output to the utilization device, and a timing source comprising an oscillator 38 and a digital divider 40 and having dump and sample pulse outputs for controlling the quenching rate of the I & D filter and the sampling rate of the digital detector. An integrate and dump filter suitable for use in the receiver is described in Pat. No. 3,056,890 and a suitable digital detector is described in application Ser. No. 449,658 filed Apr. 20, 1965, in the names of Dennis J. Gooding and Andrew Wartella, employees of applicants' assignee, and assigned to the United States of America as represented by the Secretary of the Air Force.

In a DPSK system, as is well known, information is transmitted by the presence or absence of phase reversals on the carrier. In demodulating a DPSK signal, the phase of each information bit is compared to the phase of the previous bit. If a phase reversal occurs, a "mark" or "1" bit is indicated, and if the phase remains the same, a "space" or "0" bit is indicated. Hence, I & D filter 34 is arranged to integrate the IF signal for a period equal to that of one information bit and to be quenched at the end of each such period; i.e., the filter is dumped at the information bit rate. The digital detector 36 samples the IF output from the I & D filter at the information bit rate, makes a decision as to whether there is a phase difference between information bits, and provides an output signal to the utilization device 32 indicating whether received bits are "marks" or "spaces." To enable the demodulator to provide a coherent output, the timing source which controls quenching and sampling must be bit synchronized with the transmitter information; i.e., the I & D filter must start integrating at the start of the transmitted information bit period and be quenched at the end of the transmitted information bit period.

Prior solutions to this problem of establishing bit synchronization have been relatively complex and unreliable. For example, one obvious solution is transmission of a single, short (<< bit length), amplitude modulated pulse. The pulse can be envelope detected, and the leading edge used to establish synchronization. This technique, however, requires a broad bandwidth to obtain the required definition, which, in turn results in a degradation of signal-to-noise ratio during transmission of synchronizing pulses if the transmitter is peak power limited. Also, dynamic range is a problem in detecting amplitude modulated pulses.

Another solution to bit synchronization is the use of a short pattern generator in a search and lock technique where the receiver is hunting for a correlation peak. This technique, however, is considerably more complex from an implementation point of view, and also presents dynamic range problems in the decision circuits.

Yet another known solution employs an auxiliary channel and operates on amplitude comparison information to provide bit synchronization. The present invention, on the other hand, achieves bit synchronization using the existing information channel, with some minor modifications, and operates on phase information rather than amplitude information, thereby providing a significant signal to noise improvement.

With an appreciation of the shortcomings of available bit synchronization techniques, applicants have as a general object of the present invention to provide improved means for bit synchronizing a local timing source with a received binary coded signal.

A principal object of the invention is to provide improved means for establishing and maintaining bit synchronization between a DPSK transmitter and receiver.

Another object is to provide bit synchronization for a digital communication system which does not require an additional channel in the receiver.

A further object is to provide a digital communication system in which bit synchronization is accomplished using phase decision circuitry, as opposed to amplitude detection and comparison circuits, thereby providing improved signal-to-noise characteristics.

A still further object of the invention is to simplify receiver construction in a digital communication system by eliminating the need for an auxiliary bit synchronizing channel in the receiver.

Yet another object is to provide a bit synchronization technique for a digital communication system having improved reliability and signal-to-noise performance at minimum cost and complexity.

Briefly, the foregoing objects are achieved in a DPSK communication system by transmitting to the receiver for a given period of time an all "mark" phase reversing message offset by one-half an information bit. At the receiver, the existing information channel is used for bit synchronizing, except that the DPSK demodulator, which includes an I & D filter, digital detector and timing source, is slightly modified. More specifically, the digital divider in the timing source is made variable, and a feedback signal path is provided between the digital detector and divider. In the synchronizing mode, the phase of the I & D filter output is sampled twice each integration interval and the timing source is advanced or retarded in response to the presence or absence of a phase change in that interval. Hence, the sampled phase is used in a closed loop feedback circuit to locate the I & D filter sample and dump pulses at the peak of the correlation curve.

Other objects, features and advantages of the invention, and a better understanding of its construction and operation, will be evident from the following description taken in connection with the accompanying drawings, in which.

Figures 1, 2:
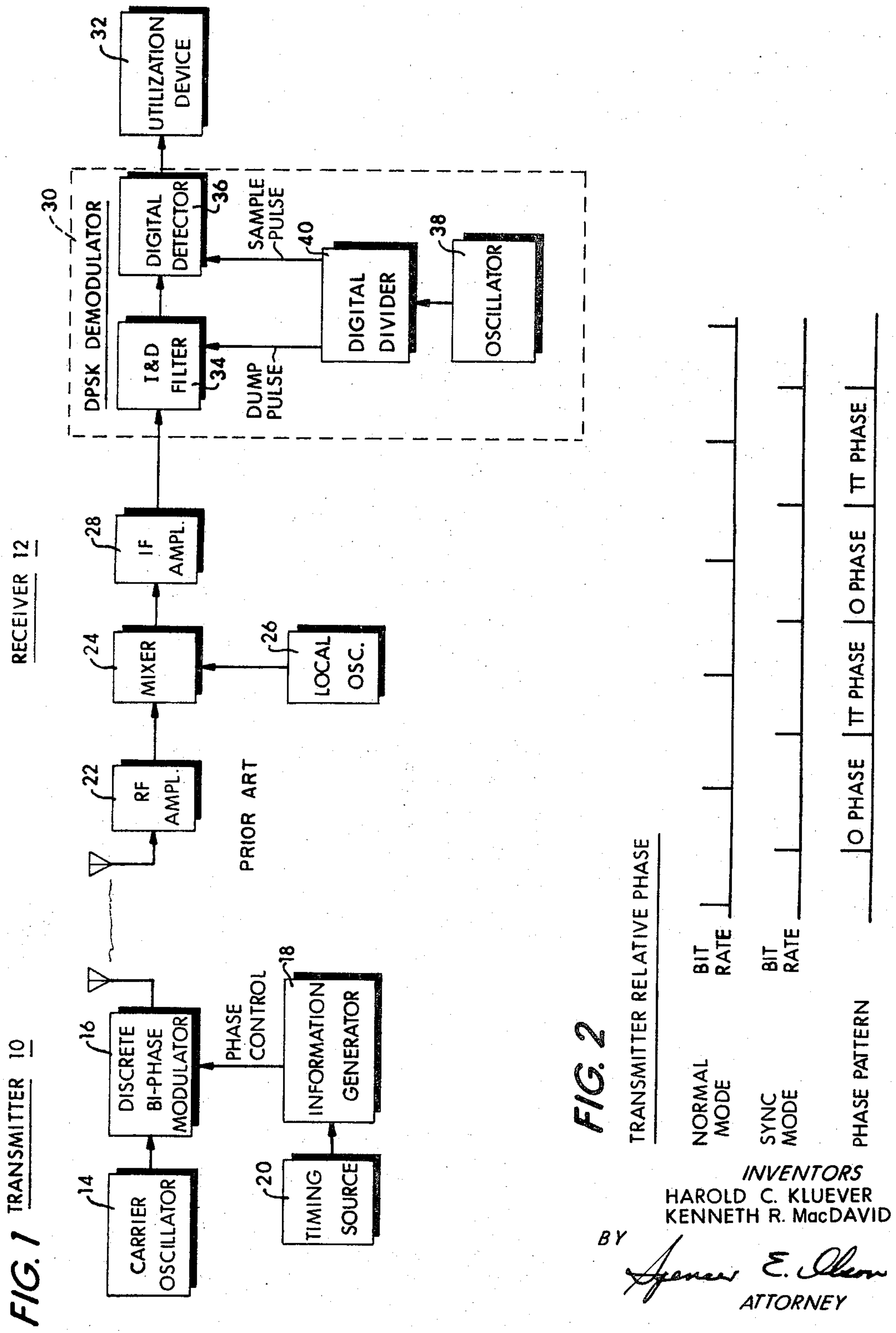
FIG. 1 is a block diagram of a typical prior art DPSK communication system, to which reference has previously been made.
FIG. 2 is a timing diagram showing the relative phase of information transmitted in the normal and synchronizing modes in accordance with the present invention.

The present invention solves the problem of establishing bit synchronization between a DPSK transmitter and receiver of the type shown in FIG. 1 by a relatively simple technique which permits use of the normal DPSK information channel with only relatively minor circuit modifications. In accordance with the invention, system operation is divided into a synchronizing mode and a normal mode. In the normal mode, the system operates as previously described; that is, a binary coded DPSK signal consisting of a sequence of information bits at a substantially constant rate, coded by the presence or absence of phase-reversals, is transmitted to the receiver. At the receiver, the demodulator I & D filter is quenched at the information bit rate by dump pulses from the timing source, and the digital detector is operative in response to timing source sample pulses to sample the output of the I & D filter just prior to each quenching, at the information bit rate, and perform sample storage and comparison functions to indicate the relative phase difference between information bits.

During the synchronizing (SYNC) mode of operation, a series of phase reversals (all "mark" information) is transmitted at the information bit rate, but offset in phase by one-half an information bit from normal mode timing. The relative phase of the information transmitted in the normal and synchronizing modes is illustrated in the timing diagram of FIG. 2. At the receiver, the demodulator I & D filter is still quenched at the information bit rate, but the sampling rate is doubled and middle of the bit decisions are inhibited so as only to compare the phase of a sample at the end of an information bit period, just prior to quenching, with that in the middle of the bit, half way between dump pulses, and means is provided for varying the output pulse rate of the timing source in response to correction signals from the digital detector. By this technique, as will be described in more detail hereinafter, bit synchronization is obtained.

System operation may be switched to the synchronizing mode by any one of a number of methods. For example, the transmitter and receiver may be programmed on a real-time basis to switch to the synchronizing mode for a specified length of time at periodic intervals. This method not only establishes bit synchronization, but assures that such synchronization is maintained in the presence of possible sources of desynchronization, such as oscillator drift or movement of the transmitter or receiver.

Another method comprises transmitting a known command message which can be detected by the receiver regardless of the state of synchronization. For example, if a series of "0" or "space" bits is transmitted (i.e., a period of no phase-reversals) the detector, even though out of synchronization in dump and sample pulse timing, will provide a coherent output of a series of "spaces" to the utilization device 32. The decoder in the utilization device can be designed to recognize this command message and signal the demodulator to operate in the synchronizing mode for a given period of time.

Figures 3, 5:
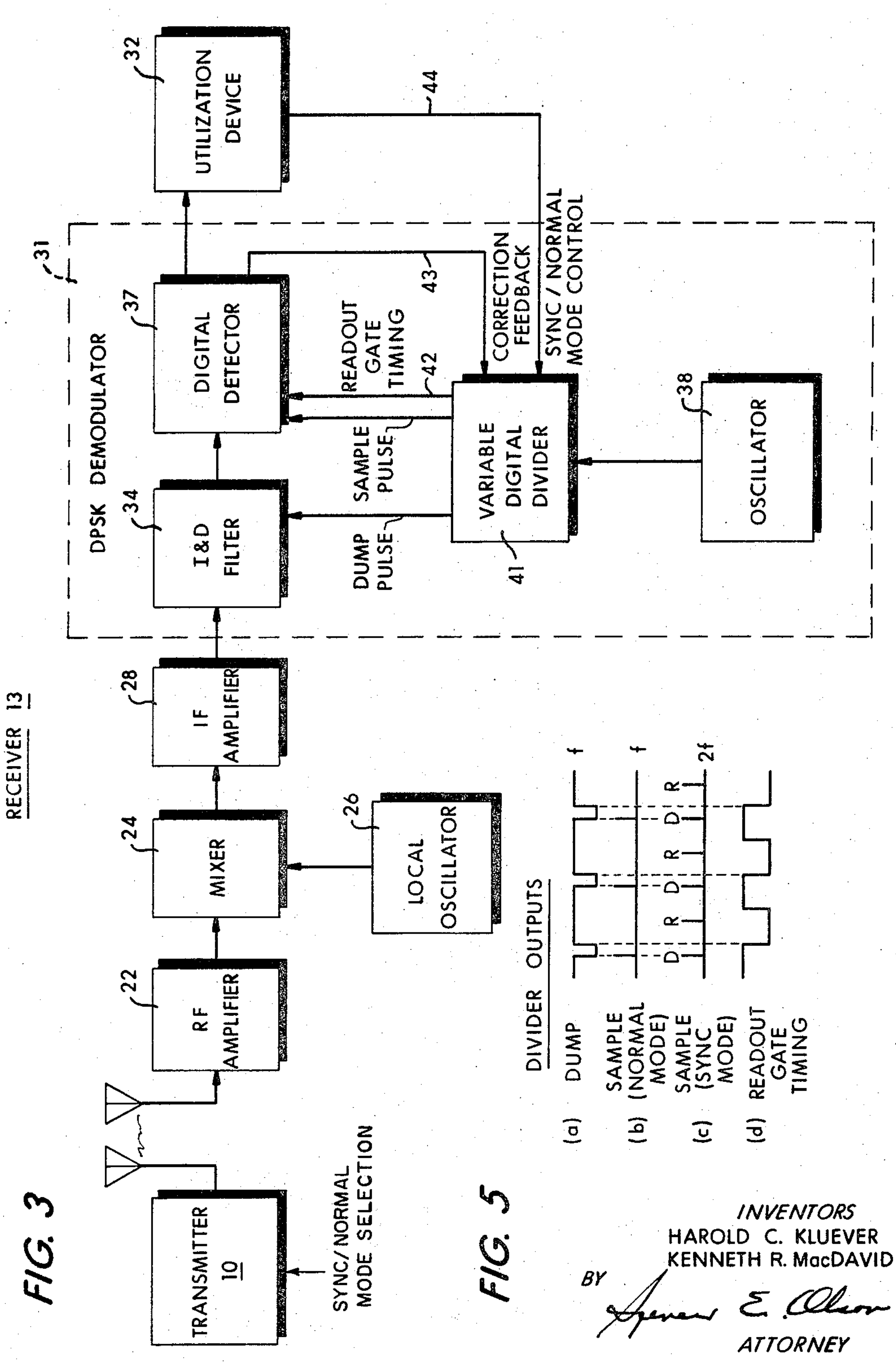
FIG. 3 is a block diagram of a DPSK communication system including a demodulator circuit in accordance with the present invention.
FIG. 5 is a timing diagram of the pulse outputs of the variable digital divider of FIG. 4.

Referring now to the system block diagram shown in FIG. 3, it will be noted that receiver 13 is similar to receiver 12 (FIG. 1), except that DPSK demodulator 31 has been modified to enable its being used for bit synchronizing the demodulator timing source with the received DPSK signal. More specifically, a digital detector 37 is employed which is identical to detector 36 except for the inclusion of a readout gate, a variable digital divider 41 is used to provide the dump and sample pulse outputs, and the following signal paths are added: a readout gate timing path 42 from the divider to detector, a correction feedback path 43 from the digital detector to the divider, and a synchronizing/normal mode control path 44 from the utilization device to the divider.

Digital detector 37 may also be similar to the circuit described in aforesaid patent application Ser. No. 449,658 which will here be described to the extent necessary to show its relationship to the balance of the system. It comprises a sampling gate controlled by the sample pulse output of divider 41, a resettable recirculating counter for storing the phase of each sample, logic circuitry for comparing the phase of each sample with that of the immediately preceding sample and providing a decision signal output indicative of the presence or absence of a phase change between compared samples, and associated timing circuits. The decision signal output element of the therein described detector consists of an AND gate controlled by the counter via a logic matrix to allow or inhibit each pulse from the sampling gate, thereby indicating a "mark" or a "space," respectively. In the present system, however, a flip-flop is preferably employed as the detector decision output element rather than an AND gate, and the counter matrix signal is applied as a steering voltage to control whether the flip-flop is set or reset by trigger pulses from the sampling gate. In the normal mode, if a phase transition occurs between samples, the counter matrix signal allows the decision flip-flop to be triggered to the set condition by the pulse from the sampling gate, thereby storing a "1" in the flip-flop and providing a corresponding first voltage level as the detector output indicating a "mark" decision. Absence of a phase change results in a "0" being stored in the decision flip-flop and a second voltage level, indicating a "space," is provided as the output signal to the utilization device 32.

Correction feedback path 43 is connected to one of the output terminals of the output flip-flop of the detector. Consequently, during the synchronizing mode, the output flip-flop provides a two-state control voltage for application to variable digital divider 41 as a pulse rate correction. More specifically, the "1" voltage level, which indicates a phase change between samples, signals the divider to advance the dump and sample pulse rates, and the "0" voltage level represents a retard decision. Although the sampling rate is twice the dump rate in the synchronizing mode, a readout gate is provided for inhibiting the trigger to the decision flip-flop in the middle of a bit; this readout gate may be a trigger input AND gate controlled by timing signals applied via path 42. Hence, the state of the decision flip-flop in the sync mode represents the comparison of the I & D filter output phase at the end of a bit with that in the middle of the bit.

Figure 4:
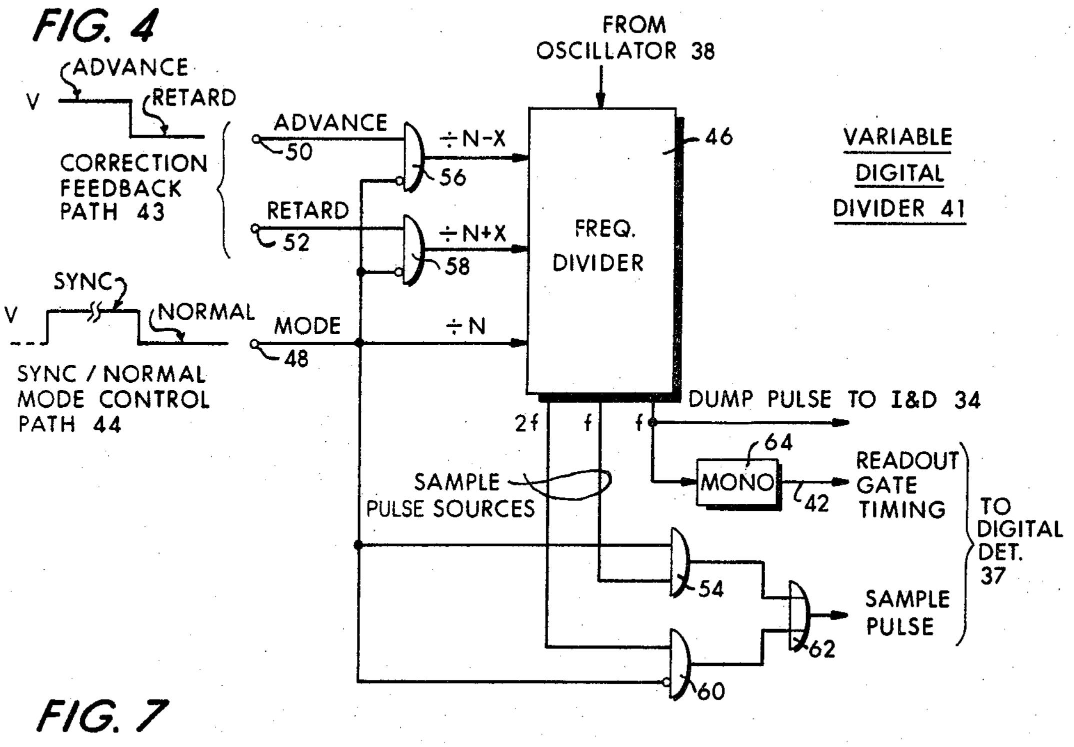
FIG. 4 is a block diagram of a variable digital divider useful in the DPSK system of FIG. 2.

Referring now to the block diagram of FIG. 4, the variable digital divider 41 may comprise a conventional digital frequency divider 46 adapted to be varied in division ratio in response to control signals applied thereto and appropriate control logic circuitry. Typically, divider 46 is a digital counter consisting of a series of flip-flop stages with an output reset monostable having feedback connections to certain of the flip-flops to provide the desired count. To enable control of the division ratio, divider 46 also includes appropriate logic circuitry to vary the count by switching the feedback connections in response to applied control signals.

Divider 46 has an input terminal connected to the output of oscillator 38, a set of pulse outputs providing two sources of sample pulses and one source of dump pulses, and three control terminals, $\div$N, $\div(N+X)$ and $\div(N-X)$, there N is the normal mode division ratio and X is the correction step. If the dump pulse rate is $f$, then the pulse repetition rates of the sample pulse sources are $f$ and $2f$, respectively, the $2f$ output being derived from an appropriate flip-flop stage of the divider. Application of a control signal to the $\div$N terminal of divider 46 provides sample and dump pulse outputs with $f$ equal to the information bit rate. Typically, the $f$ sample pulses occur at the leading edge of the dump pulses, as illustrated by waveforms ($a$) and ($b$) in the timing diagram of FIG. 5, so as to provide sampling just prior to quenching. Application of a control signal to the $\div(N+X)$ terminal changes the division ratio to reduce the output pulse rates and may therefore be referred to as a retard correction. The $\div(N-X)$ count provides an increase in the output pulse rates and is called an advance correction.

The variable digital divider 41 is shown as having three control terminals: a mode control terminal 48 to which signal path 44 from utilization device 32 is connected, and advance and retard terminals 50 and 52, respectively, to which correction feedback path 43 from detector 37 is connected. The sync/normal mode control signal is derived from a programmer or decoder in the utilization device 32, as previously described, and, typically, may comprise a square pulse waveform signal whereby the reference level represents the normal mode and the pulse width represents the duration of the synchronizing mode.

Mode control terminal 48 is connected in parallel to the $\div$N control terminal of divider 46, to an input of an AND gate 54, and to the inhibit inputs of AND gates 56, 58 and 60. Advance terminal 50 is connected to the other input of AND gate 56, the output of which is connected to the $\div(N-X)$ terminal of divider 46, and retard terminal 52 is connected to the other input of AND gate 58, which has its output connected to the $\div(N+X)$ control input of divider 46. The dump pulse output of divider 46 is connected directly to the quench control terminal of I & D filter 34. The $f$ and $2f$ sample pulse outputs, however, are connected to the other inputs of gates 54 and 60, respectively, and the outputs of AND gates 54 and 60 are connected via an OR gate 62 to the sample pulse input of detector 37. The dump pulse output of divider 46 is also connected to the trigger input of a monostable circuit 64, the output of which—a square wave timing signal—is applied to the readout gate of detector 37 via path 42.

In operation, a normal mode signal level at terminal 48 inhibits correction feedback gates 56 and 58 and the $2f$ sample pulse output gate 60, signals divider 46 to provide output pulses at the information bit rate, and enables gate 54 to allow the $f$ sample pulses to be applied directly to detector 37 at the information bit rate. A sync mode signal level at terminal 48, however, removes the inhibit signals from gates 56, 58 and 60, removes the enabling signal from gate 54, and removes the $\div$N control signal. The correction feedback signal applied via path 43 from the detector output flip-flop to terminals 50 and 52, as previously mentioned, is a two state signal whereby a first voltage level or a "1" indicates a phase change between samples and a second voltage level or "0" indicates absence of a phase change. As correction signals, the first voltage level represents the need for an advance in the pulse rate, and the second voltage level represents a retard correction signal. Consequently, in the absence of inhibit signals, advance gate 56 allows only the advance signal level, and retard gate 58 allows only the retard signal level.

During the synchronizing mode, therefore, the output pulse rates of divider 46 are controlled only by the advance and retard correction signals, an advance voltage level signalling divider 46, via terminal 50 and gate 56, to divide the oscillator frequency by $N-X$ to thereby increase the output pulse rates, and a retard signal, applied via terminal 52 and gate 58, reducing the divider pulse rates by an $N+X$ division ratio. Also during the synchronizing mode, only the $2f$ sample pulse source is enabled, via gate 60, such that the sample pulse rate applied to detector 37 from divider 41 is double the receiver bit rate, as illustrated in FIG. 5($c$). The divider 46 dump pulse output (FIG. 5($b$)) is also applied so as to fire monostable 64 with its trailing edge at the receiver bit rate and thereby provide the timing pulse output shown in FIG. 5($d$), for controlling the readout AND gate in detector 37.

Each negative-going pulse from monostable 64 is operative to disable the detector readout gate, the time constant of the monostable being selected so as to provide a pulse duration sufficient to inhibit middle of the bit decisions but allow end of bit decisions as follows: Referring to waveform ($c$) in FIG. 5, it will be noted that the doubled sample rate during the sync mode provides one set of sample pulses, labeled D, which coincide with the leading edge of the dump pulses, and hence occur prior to the firing of monostable 64 at a point on the timing waveform ($d$) during which the detector readout gate is enabled, and another set of sample pulses, denoted R, which fall half-way between dump pulses; that is, sample pulses occur at the middle and end of each integration interval. For purposes of explanation, the R, or middle of bit pulses, will be called reference samples and the D, or end of bit pulses, will be referred to as decision samples. Arrival of a sample pulse at the detector enables the detector sampling gate to allow the first positive zero crossing of the IF signal output from the I & D filter to produce a gate output pulse. The gate output pulse initiates reset of the recirculating counter of the detector to thereby store the phase of the IF sample, and is applied to the readout gate at the trigger input of the decision flip-flop of the detector. If this sample pulse is a reference sample, the gate output pulse will initiate counter reset to store phase, but it will be blocked by the readout gate from triggering the decision flip-flop; that is, a reference sample triggers detector storage but not decision. If a decision sample pulse is applied to the detector, however, phase storage will be accomplished and the readout gate will be enabled by the timing pulse from monostable 64 to allow the decision output flip-flop to be triggered. In other words, the readout gate is timed to inhibit sample comparison decision at the middle of each integration interval, but to allow such decision at the end of the integration interval.

Summarizing the operation of the DPSK system of

FIG. 3 during the synchronizing mode, the transmitter sends an all "mark" phase reversing message offset by one-half an information bit, as illustrated in FIG. 2. At the receiver the following sequence of events takes place:

(1) The digital detector samples the IF output from the I & D filter at twice the normal bit rate. This process compares the phase at the end of a receiver bit period (just prior to quenching) with the phase at the middle of the bit period (halfway between dump pulses).

(2) If a phase change occurs between the middle and end of the bit, a decision is made to advance the timing chain, this being accomplished by varying the timing source division ratio to increase the dump and sample pulse rates.

(3) If no phase change occurs between the middle and end of the bit, a decision is made to retard the receiver timing chain, this being effected by varying the timing source division ratio to decrease the dump and sample pulse rates.

Figure 6:
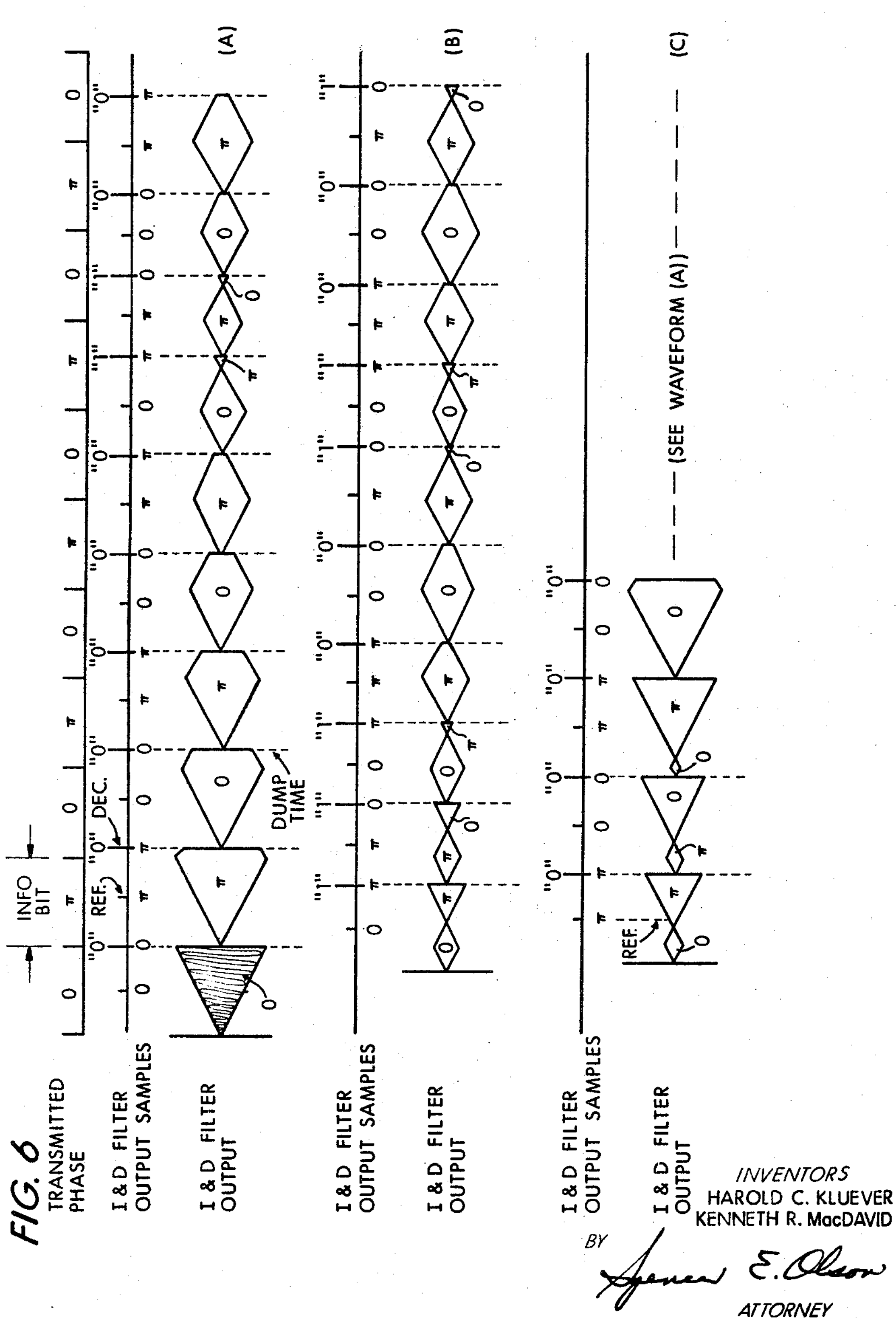
FIG. 6 is a timing diagram of a typical synchronizing cycle of the DPSK system of FIG. 2.

A continuous time pattern of the receiver synchronizing cycle using one-tenth of a bit correction steps is shown in the timing diagram of FIG. 6. The one-tenth steps are presented for illustrative purposes only and can be provided in the system by designing divider 46 such that the $N-X$ division ratio advances the pulse rate to thereby reduce the receiver bit period by one-tenth of an information bit and the $N+X$ division ratio retards the timing rate to lengthen the receiver bit period by one-tenth of an information bit.

The top scale line of the FIG. 6 timing diagram indicates the phase pattern of the transmitted information bit stream in the synchronizing mode; that is, the bit rate is offset by one-half an information bit from normal mode timing (as illustrated in FIG. 2). This is the phase pattern of the IF signal input to the I & D filter. Waveforms (A), (B) and (C) illustrate the envelope pattern of the integrate and dump filter output for three different initial out-of-synchronization conditions. The time scales of these waveforms are all referred to the transmitter information bit phase pattern of the top scale line. In an effort to simplify the waveform drawings for purposes of clarity, the IF signal waveform bounded by the I & D output envelope patterns has been omitted from all but the first integration interval of waveform (A). The 0 and $\pi$ radians label associated with each envelope enclosure indicates the phase of the IF signal within that envelope enclosure.

Immediately above each waveform is a scale of the I & D filter output sample times for that respective waveform. The short time marks denote reference samples and the longer time marks represent decision samples. The phase of the output sample (0 or $\pi$ radians) is indicated just below each time mark, and the "0" or "1" decision for each integration interval is denoted just above each of the longer "decision sample" time marks. The vertical dotted line aligned with each decision sample time mark represents the dump times.

Waveform (A) starts with an initial phase offset of ½ information bit, the maximum out-of-synchronization condition. That is, the receiver timing is ½ bit out of synchronization with normal mode timing; this, of course, makes the receiver bit rate in synchronization with the sync mode bit rate, since the sync mode timing is also offset ½ bit from normal mode timing. Consequently, the energy in the integrate and dump filter 34, which is of 0 radian phase relative to the input, builds up rapidly to a maximum level and is then dumped without a change in the phase of the output. Hence, the first sampling cycle establishes a reference sample which is 0 radians with the decision sample also being 0 radians. This condition of no phase change in the IF signal output from the I & D filter causes a "0" or retard signal level to be applied to the timing source. The retard correction is inserted into the receiver timing by extending the interval of the variable divider. This results in a lengthened integration interval over the next bit. Consequently, the second interval between dump pulses includes the effect of an input information phase reversal (from $\pi$ to 0) toward the end of the interval. That is, the IF signal energy in integrator 34 builds up with a relative phase of $\pi$ radians to the phase reversal point of the input signal, as illustrated by the positive slope of the top envelope, and then, due to the input signal phase reversal, the integrator energy is subtracted, as illustrated by the negative slope of the top envelope. The IF signal energy stored in the integrator just prior to dump, however, is still of the same relative phase of $\pi$ radians due to the inherent time delay of the I & D filter. Hence, the retard correction signal is maintained. It will be noted, in fact, that the "0" or retard condition continues until a stored energy phase reversal occurs between the reference and decision samples.

During the integration interval resulting in a "1" decision, the energy initially of 0 phase builds up at a relatively slow rate to the point of input signal phase reversal and then is reduced at a rapid rate during the $\pi$ phase input signal, since more energy is applied when the phase is reversed. Indeed, as illustrated by the envelope crossover, the energy is subtracted at such a rapid rate after the input phase reversal that the phase of the stored energy is reversed. Hence, whereas the reference sample of the IF signal output of the I & D filter is 0 radians, the decision sample is $\pi$ radians. Consequently, a "1" decision, indicating a phase change between the middle and end of the bit, is made and an advance signal level is applied to the timing source. An advance correction is inserted into the timing chain by reducing the length of the integration time over the next bit.

During the next bit, another "1" or advance correction is made which steps the phase decision back to where a retard or "0" decision is made. The movement back and forth across the phase "axis" continues until the termination of the synchronizing mode. The ideal in-sync I & D output envelope during the synchronizing mode would be of diamond shape with zero stored energy at dump time. Such an I & D ouput envelope indicates the dump pulses are ½ bit offset from the sync mode timing or exactly bit synchronized with normal mode timing. This ideal in-sync envelope leads to sampling ambiguity, however, as will be described below; hence, bit synchronization is actually established to within some small fraction of an information interval, as illustrated by the last two I & D output envelopes of waveform (A).

Figure 7:
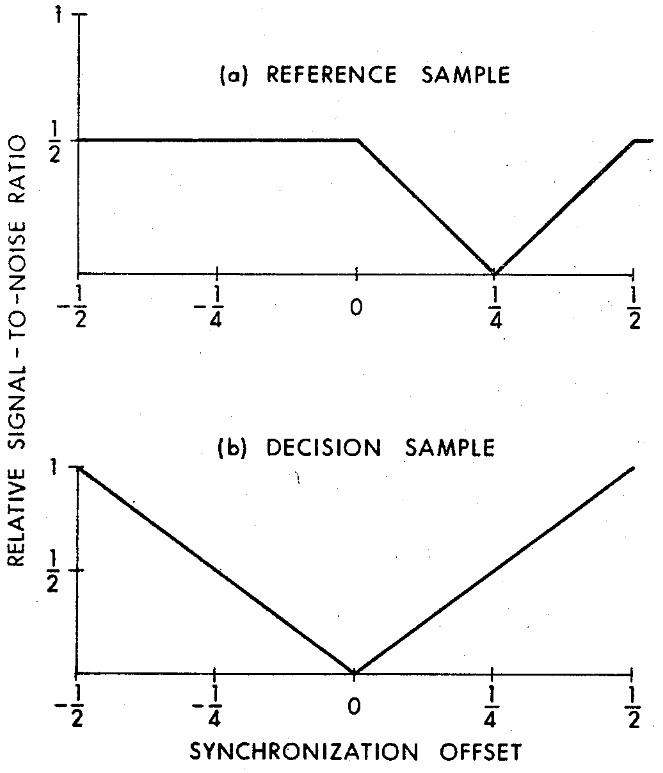
FIG. 7 is a set of graphs illustrating the relative signal-to-noise ratio vs. synchronization offset for reference and decision sampling of a system embodying the invention.

To facilitate discussion of the ambiguous sampling regions, reference is now made to FIG. 7 in which graphs (*a*) and (*b*) show plots of the relative signal-to-noise ratio of the reference and decision samples, respectively, for various out-of-synchronization conditions. From FIG. 7(*a*), it can be seen that the reference sample has a maximum $S/N$ ratio when taken with the receiver timing offset any where from 0 to ½ bit ahead of the normal mode transmitter timing, the value of this maximum $S/N$ ratio being ½ the overall maximum value for sync mode data transmission. It will also be noted that when the sync offset of the receiver timing is lagging by ¼ information bit, the reference phase sample is taken at zero $S/N$ ratio. Referring to FIG. 7(*b*), a maximum $S/N$ ratio of one occurs for decision samples taken when the receiver is offset by ½ bit, and a $S/N$ ratio of zero occurs for decision samples taken when the sync offset is 0; i.e., the receiver is precisely bit synchronized.

The diagrams of FIG. 7 exhibit two points of ambiguity which exists with respect to the receiver timing advance-retard decison; namely, those states of synchronizing mode operation where either the phase reference sample or the phase decision sample is taken at a zero signal-to-noise ratio and is therefore based on random noise. In either case a random advance-retard correction will be made to the receiver timing source. The former case, as will be noted from FIG. 7(*a*), can only occur when the receiver timing is exactly ¼ bit behind transmitter normal mode timing. In this condition, however, a correction step in either direction from the ¼ bit offset will result in a decision to continue stepping in that direction until synchronism has been achieved. In the latter case of the receiver being precisely bit synchronized and the decision sample being taken at zero $S/N$, a step in either direction away from synchronism results in a decision output signal to return toward synchronism.

Returning now to FIG. 6, corrections from the ambiguous sampling regions are particularly illustrated by waveforms (B) and (C). Waveform (B) is shown with an initial phase offset of slightly less than ¼ bit lagging (an increment to the left of ¼ in FIG. 7(*a*)); in this case, the advance correction feedback signal steps the system in the shortest direction toward zero offset and into synchronism. Waveform (C), on the other hand, starts with an initial phase offset of slightly more than ¼ bit lagging (an increment to the right of ¼ in FIG. 7(*a*)); from this condition, the system takes the longer route and steps back to waveform (A) before going into synchronism. The last series of integration intervals of waveform (B) particularly illustrate the corrective action about the zero sync offset point when the decision sample is taken in an ambiguous region.

From the above description, it is seen that the present invention provides considerable advantages in achieving bit synchronization between a DPSK transmitter and receiver. It uses the existing DPSK receiver information channel with some rather minor circuit modification, and hence avoids need for the usual auxiliary bit synchronizing channel. Using the existing DPSK demodulator, timing corrections are accomplished using phase decision circuitry, thereby providing improved signal-to-noise characteristics over amplitude detection means. The described bit synchronization technique provides improved reliability and signal-to-noise performance at minimum cost and complexity.

It will be understood, however, that the invention is not limited to DPSK systems, but is obviously applicable to any system requiring bit synchronization of a local timing source to received binary coded information. For example, in application to a PSK communication system, the transmitter would still transmit phase reversals at the information bit rate offset by ½ bit from normal timing in the sync mode; in this case, however, the sync message would be a stream of alternate "marks" and "spaces" since in a PSK system a 0° phase shift from a fixed phase reference represents a "mark," and a 180° phase shift from the fixed reference represents a "space." Further, the described DPSK demodulator would not be part of the normal PSK information channel, but would only be used for bit synchronization.

The technique is also applicable to bipolar analogue communications systems employing a DC carrier, such as those used in telephone systems. In this case, the described demodulator would employ a DC integrator in place of an I & D filter; polarity reversals would be transmitted in the sync mode; and, amplitude rather than phase would be sampled, stored and compared.

Thus, although the invention has been described with respect to a particular embodiment thereof, it is not to be so limited as changes and modifications may be made therein which are within the full intended scope of the invention as defined by the appended claims.

What is claimed is:

1. In a communication system including transmitter means operative in a normal mode to transmit intelligence in the form of a binary coded signal consisting of a sequence of information bits at a substantially constant rate coded by the presence or absence of signal state-reversals, and receiver means including a demodulator timing source having first and second pulse outputs, apparatus for bit synchronizing said timing source with a received binary coded signal, said apparatus comprising: means in said transmitter operative selectively to change operation thereof from said normal mode to a synchronizing mode consisting of transmission of signal state-reversals at said substantially constant rate offset in phase by one-half an information bit from normal mode timing; means in said receiver means operative to integrate said received binary coded signal and to be quenched in response to dump pulses applied thereto from the first pulse output of said timing source; detection means connected to said integrating means and operative to sample the output of said integrating means, to store the signal state of said sample, and to compare the signal state of each sample with that of the immediately preceding sample and to provide a decision signal output indicative of the presence or absence of a signal state change between compared samples, the sampling of the output of said integrating means being controlled by sample pulses applied to said detection means from the second pulse output of said timing source; means operative to double the sample pulse rate applied to said detection means during said synchronizing mode of operation over the rate during said normal mode whereby sample pulses occur at the middle and end of the integration interval between dump pulses; means operative to inhibit sample comparison decision of said detection means at the middle of said integration interval; and means for varying the output pulse rate of said timing source in response to correction signals applied thereto from the decision signal output of said detection means during said synchronizing mode.

2. Apparatus in accordance with claim 1 wherein said binary coded signal is a differentially phase shift keyed signal, and signal state refers to phase.

3. Apparatus in accordance with claim 1 wherein said binary coded signal is a phase shift keyed signal, and signal state refers to phase.

4. Apparatus in accordance with claim 1 wherein said binary coded signal is a bipolar signal, signal state refers to polarity or amplitude, and said integrating means is a direct current integrator.

5. In a digital communication system including means operative in a normal mode to transmit a binary coded signal consisting of a sequence of information bits at a substantially constant rate coded by the presence or absence of phase-reversals, and receiver means for receiving said signal including a demodulator timing source having first and second pulse outputs, apparatus for bit synchronizing said timing source with the received binary coded signal, said apparatus comprising: means in said transmitter operative selectively to change operation thereof from said normal mode to a synchronizing mode consisting of transmission of phase-reversals at the information bit rate offset in phase by one-half an information bit from normal mode timing; a resonant integrating circuit having an input to which said received binary coded signal is applied and operative to be quenched in response to dump pulses applied thereto from the first pulse output of said timing source, said resonant circuit being tuned to the frequency of the signal applied to its input; a detector having an input coupled to the output of said resonant integrating circuit and operative to sample said resonant circuit output, store the phase of said sample, compare the phase of each sample with that of the immediately preceding sample and provide a decision signal output indicative of the presence or absence of a phase change between compared samples, said detector being controlled in sampling by sample pulses applied thereto from the second pulse output of said timing source; means for doubling the sample pulse rate applied to said detector during said synchronizing mode of operation, whereby sample pulses occur at the middle and end of the integration interval between dump pulses; means for inhibiting said detector phase change decision at the middle of said integration interval; and, means for varying the output pulse rates of said timing source in response to correction signals applied thereto from the decision signal output of said detector during said synchronizing mode.

6. Apparatus in accordance with claim 5 wherein said resonant integrating circuit is an integrate and dump filter.

7. Apparatus in accordance with claim 6 wherein said timing source comprises an oscillator having an output terminal, a frequency divider connected to the output terminal of said oscillator, and wherein said means for varying the output pulse rates of said timing source comprises means operative to vary the division ratio of said divider in response to said correction signals.

8. In a digital communication system including means operative in a normal mode to transmit a binary coded signal consisting of a sequence of information bits at a substantially constant rate coded by the presence or absence of phase-reversals, and receiver means including a demodulator comprising a timing source of dump and sample pulses, a resonant integrating circuit having an input to which said received binary coded signal is applied and operative to be quenched in response to dump pulses applied thereto from said timing source, said resonant circuit being tuned to the frequency of the signal applied to its input, and a digital detector having an input coupled to the output of said resonant integrating circuit and operative to sample said resonant circuit output, store the phase of said sample, compare the phase of each sample with that of the immediately preceding sample and provide a decision signal output indicative of the presence or absence of a phase change between compared samples, said detector adapted to be controlled in sampling by sample pulses applied thereto from said timing source, apparatus for bit synchronizing said demodulator timing source with the received normal mode binary coded signal comprising: means in said transmitter operative selectively to change operation thereof from said normal mode to a synchronizing mode consisting of transmission of a binary coded signal consisting of phase-reversals at the information bit rate offset in phase by one-half an information bit from normal mode timing; means operative in response to receipt of said synchronizing mode binary coded signal to double the sample pulse rate applied to said detector whereby sample pulses occur at the middle and end of the integration interval between dump pulses; means operative to inhibit said detector phase change decision at the middle of said integration interval; and, means operative in response to said synchronizing mode binary coded signal for varying the dump and sample pulse rates of said timing source in response to correction signals applied thereto from the decision signal output of said detector.

References Cited

UNITED STATES PATENTS

| | | | |
|---|---|---|---|
| 3,059,188 | 10/1962 | Voelcker | 178—66 X |
| 3,128,343 | 4/1964 | Baker | 178—67 |
| 3,349,330 | 10/1967 | Wedmore | 325—30 X |

ROBERT L. GRIFFIN, *Primary Examiner.*

J. T. STRATMAN, *Assistant Examiner.*